Dec. 3, 1968  R. M. ROWELL  3,413,853
ZENER DIODE TEMPERATURE METER
Filed April 11, 1966

*INVENTOR.*
RALPH M. ROWELL
BY Richard E. Horley

ATTORNEY.

_United States Patent Office_

3,413,853
Patented Dec. 3, 1968

3,413,853
ZENER DIODE TEMPERATURE METER
Ralph M. Rowell, Lynn, Mass., assignor to General
Electric Company, a corporation of New York
Filed Apr. 11, 1966, Ser. No. 541,740
5 Claims. (Cl. 73—362)

ABSTRACT OF THE DISCLOSURE

A voltage stabilized temperature meter which is substantially insensitive to voltage, frequency or ambient temperature variations. Voltage and frequency stabilization is provided by a Zener diode voltage regulator circuit. A resistive voltage dropping circuit, including a coupling resistor and a temperature compensating resistor, couples load current from the power supply to the input of a resistive measuring bridge with the temperature compensating resistor being connected to shunt a portion of the load current.

Background of the invention

This invention is generally directed to temperature meters and more especially to an improved temperature meter for providing accurate temperature indications.

Electrical temperature meters utilizing resistance temperature detectors are well-known in the art. Generally, the electrical temperature meter includes an energized ratio instrument circuit such as a D.C. energized resistance bridge in which one leg comprises a temperature sensitive resistor. Output signals from the bridge vary as a function of temperature and are usually monitored by a current measuring device. However, such a temperature meter has a current output which is also proportional to the magnitude of the energizing voltage. In effect this means that a meter gives different temperature readings for a constant temperature if the voltage is not constant.

Constant voltage power supplies known in the prior art use saturable core devices to obtain voltage stability. However, the saturable core type regulating transformer has still not eliminated the errors. The well-known problems inherent in saturable cores tend to cause voltage variations in the output of the voltage supply circuit utilizing a saturated core type regulating transformer. For example, the output voltage of these saturable core devices varies with frequency changes; therefore, different saturable core devices have been required for applications wherein the energizing frequency has been changed. In addition, the physical size of the saturated core type regulating transformer is such as to provide a cumbersome and unwieldy power supply.

Therefore, it is an object of this invention to provide a voltage stabilized circuit for energizing a conventional temperature meter which substantially eliminates voltage errors to provide a true temperature reading.

It is another object of this invention to provide a voltage stabilized power supply for a temperature meter which is reduced in size over the saturated core type regulating transformer.

Summary

Briefly stated, errors in temperature meters caused by variation in voltages are substantially eliminated in accordance with this invention by utilizing a constant voltage semiconductor means device and temperature compensating means in the voltage supply circuit. Utilization of such an improved power supply provides a voltage input to the resistance bridge which is substantially constant so that the measuring device can be calibrated in terms of actual temperature readings.

The invention has been clearly and distinctly pointed out in the appended claims. However, a more thorough understanding together with a fuller appreciation of these and further objects and advantages of this system can be obtained by reference to the following description taken in conjunction with the drawings.

Description of illustrative embodiments

Figure 1:
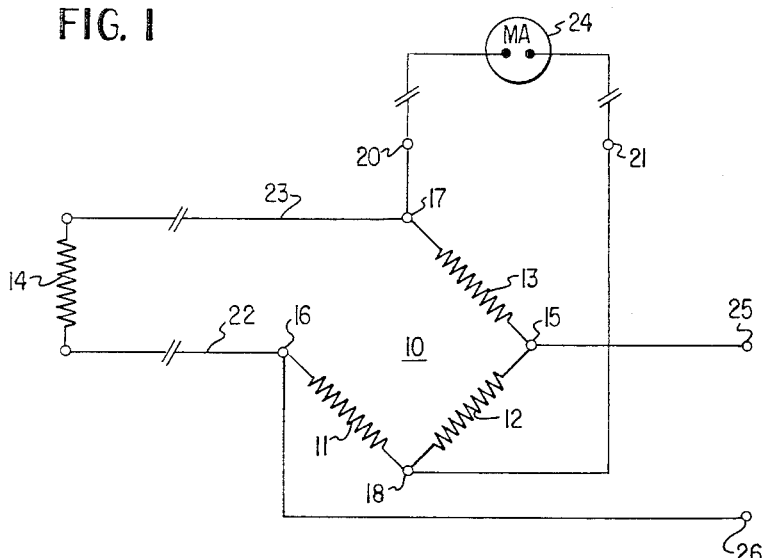
FIGURE 1 schematically presents a temperature meter utilizing voltage stabilization in accordance with this invention.

Referring to FIGURE 1, the temperature meter comprises a resistance bridge 10 having fixed resistors 11, 12, and 13 and a temperature sensitive resistor 14. Input terminals 15 and 16, formed by the common junctions of resistors 12 and 13 and of resistors 11 and 14, respectively, are coupled to a source of D.C. potential. Output terminals 17 and 18 are constituted by the junctions of 13 and 14 and of resistors 11 and 12 respectively and are connected to output terminals 20 and 21, respectively.

Generally temperature resistor 14 is physically detachable from resistance bridge 10; it is maintained in the electrical circuit by conductors 22 and 23. Temperature readout means such as a current meter 24 is connected across output terminals 20 and 21 and calibrated against a temperature standard in terms of temperature readings.

When resistance bridge 10 is energized, current in the milliammeter 24 is proportional to the value of the temperature sensitive resistor 14 and the voltage impressed on input terminals 15 and 16. However, by utilizing the present invention, voltage variations are substantially eliminated and the reading in milliammeter 24 becomes a sole function of the change in temperature of temperature sensitive resistor 14.

Figure 2:
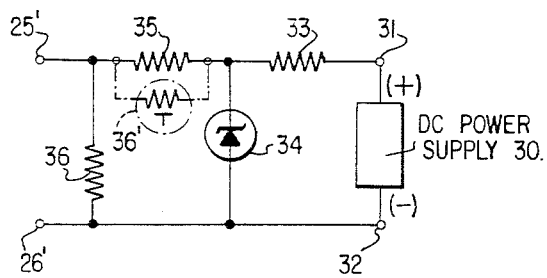
FIGURE 2 illustrates a power supply for the temperature meter in FIGURE 1 energized by an unregulated direct current source.
Figure 3:
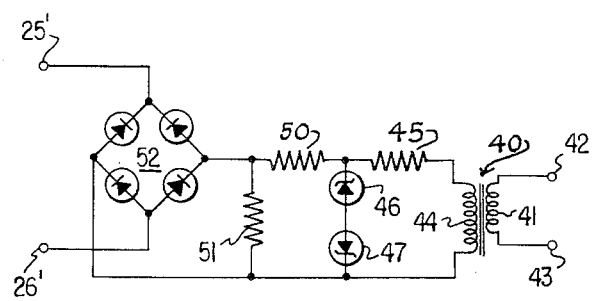
FIGURE 3 illustrates a power supply for the temperature meter in FIGURE 1 energized by an unregulated alternating current source.

FIGURES 2 and 3 represent two power supplies which can be utilized to energize the bridge circuit resistance bridge 10. They are coupled to terminal 25 and terminal 26 of the temperature meter by terminals designated as 25' and 26' in both figures.

Referring specifically to FIGURE 2, an unregulated direct current power supply 30 has a positive terminal 31 and a negative terminal 32 connected to a voltage divider comprising a voltage dropping resistor 33 and a Zener diode 34 in series. Another voltage divider comprising a resistor 35 and an optional temperature compensating shunt resistor 36 in series is connected in parallel with Zener diode 34; and the energizing voltage is taken from resistor 36. Resistor 33 and Zener diode 34 maintain a constant voltage across the terminals 25 and 26 while resistor 36, a copper resistor shunt, compensates ambient temperature changes in the Zener diodes and the measuring circuit. In this manner, a very stable voltage is obtained regardless of variations of the D.C. supply 30 or ambient temperature changes. If the circuit elements are inherently stable under varying ambient temperature conditions, resistor 36 can be eliminated. As an alternative, a temperature responsive resistor 36' shown in phantom in FIGURE 2 having a negative thermal coefficient of resistance can be placed in parallel with resistor 35.

The alternative circuit shown in FIG. 3 can be used to energize resistive bridge 10 from an unregulated alternating current supply. This unregulated power supply includes a transformer 40 having a primary 41 including terminals 42 and 43 which are adapted to be connected to an unregulated alternating current source. A secondary 44 energizes a voltage divider comprising a resistor 45 and two Zener diodes 46 and 47 connected in a back-to-back relationship for alternating current energization. Resistor 45 and Zener diodes 46 and 47 maintain a constant AC voltage which is attenuated by a voltage divider including a resistor 50 and a temperature compensating resistor 51 in series; the voltage divider is connected in parallel with Zener diodes 46 and 47. The voltage across copper resistor shunt 51 is a constant alternating current voltage which energizes a standard rectifier bridge 52 having a direct current output coupled to terminals 25' and 26' which is stabilized against input voltage variations and ambient temperature variations.

Briefly summarizing, this invention improves the readings of a temperature meter by stabilizing the voltage to the input of a resistive bridge to a constant voltage so that output current from the bridge varies as the sole function of changes in the resistance of a temperature sensitive resistor. Stabilizing the voltage supply to a constant value results in a true temperature reading each time the temperature meter is used without requiring a change when the energizing voltage changes. Furthermore, means are also provided for thermally compensating the power supply network to overcome ambient temperature changes in the diode voltage drop.

Although the invention has been described by referring to two particular embodiments thereof, it will be obvious to those skilled in the art that many variations of this invention may be practiced without departing from the true spirit and scope of the invention. Therefore, it is intended that the appended claims shall cover all such equivalent variations.

What I claim as new and desire to secure by Letters Patent of the United States is:

1. A temperature meter comprising:
   (a) an unregulated power source,
   (b) a voltage regulator circuit including a constant voltage semiconductor breakdown means and a voltage dropping resistor connected in series across said power source, said voltage regulator circuit being adapted to produce a load current,
   (c) a resistive voltage dropping circuit connected to the junction of said breakdown means and said voltage dropping resistor of said voltage regulator circuit, said resistive voltage dropping circuit including an interconnected coupling resistor and temperature compensating resistor connected so said temperature compensating resistor is energized by a portion of the load current,
   (d) a resistive bridge circuit having input and output terminals and including a temperature measuring resistor as one leg thereof,
   (e) means connecting said input terminals through said resistive voltage dropping circuit to said voltage regulator circuit, and
   (f) utilization means connected to said output terminals for indicating the temperature substantially independent of voltage, frequency or ambient temperature variations.

2. A temperature meter as recited in claim 1 wherein said coupling resistor and temperature componesating resistor are connected in series, said resistive voltage dropping circuit being in parallel with said constant voltage semiconductor breakdown means and said connecting means couple said input terminals across said temperature compensating resistor.

3. A temperature meter as recited in claim 1 wherein said coupling resistor and temperature compensating resistor are in parallel, said resistive voltage dropping circuit coupling all the load current through said connecting means to said input terminals.

4. A temperature meter as recited in claim 1 wherein said unregulated power source supplies direct current, said constant voltage semiconductor means is constituted by a Zener diode and said connecting means is constituted by a pair of conductors between said input terminals and said temperature compensating resistor.

5. A temperature meter as recited in claim 1 wherein said unregulated power source supplies alternating current, said constant voltage semiconductor breakdown means is constituted by a pair of Zener diodes in a back-to-back series connection and said connecting means includes a rectifier circuit in series between one of said input terminals and said resistive voltage dropping circuit and a conductor between the other of said input terminals and said voltage regulator circuit.

References Cited
UNITED STATES PATENTS

| | | | |
|---|---|---|---|
| 2,984,780 | 5/1961 | Koletsky | 323—66 |
| 3,036,464 | 5/1962 | Beeston | 73—342 |
| 3,102,226 | 8/1963 | Borkovitz | 323—22 |
| 3,154,947 | 11/1964 | Poshadel et al. | 73—362 |
| 3,263,092 | 7/1966 | Knauss | 323—22 XR |
| 3,300,710 | 1/1967 | Knauss | 323—81 XR |

S. CLEMENT SWISHER, *Acting Primary Examiner.*

F. SHOON, *Assistant Examiner.*